United States Patent
Fan et al.

(10) Patent No.: US 8,180,006 B2
(45) Date of Patent: May 15, 2012

(54) SPREAD-SPECTRUM GENERATOR (75) Inventors: Wen-Teng Fan, Tainan County (TW); Shih-Chun Lin, Tainan County (TW)

(73) Assignee: Himax Technologies Limited, Tainan (TW)

( * ) Notice: Subject to any disclaimer, the term of this patent is extended or adjusted under 35 U.S.C. 154(b) by 356 days.

(21) Appl. No.: 12/540,817

(22) Filed: Aug. 13, 2009

(65) Prior Publication Data

US 2011/0038397 A1 Feb. 17, 2011

(51) Int. Cl.
*H04L 7/00* (2006.01)
*H03D 3/24* (2006.01)
*H04B 1/00* (2006.01)

(52) U.S. Cl. .................... 375/354; 375/130; 375/376
(58) Field of Classification Search .................. 375/130, 375/354, 371, 372, 373, 374, 375, 376, 359, 375/360; 327/100, 141, 144–161, 231, 237, 327/252, 261, 263
See application file for complete search history.

(56) References Cited

U.S. PATENT DOCUMENTS

| | | | |
|---|---|---|---|
| 7,078,947 B2* | 7/2006 | Loh | 327/156 |
| 7,446,578 B2* | 11/2008 | Huang | 327/156 |
| 7,450,675 B2* | 11/2008 | Wang et al. | 375/354 |
| 2003/0169086 A1* | 9/2003 | Lee et al. | 327/158 |
| 2007/0057709 A1* | 3/2007 | Miyazaki | 327/156 |
| 2009/0167379 A1* | 7/2009 | Mobin et al. | 327/149 |

* cited by examiner

*Primary Examiner* — David C. Payne
*Assistant Examiner* — Vineeta Panwalkar
(74) *Attorney, Agent, or Firm* — J.C. Patents (57) ABSTRACT

A spread-spectrum generator is provided. The spread-spectrum generator includes a delay module and a control module. The delay module is controlled by a first control signal to delay an input signal by a delay time, and thereby generate a delay signal. The control module is coupled to the delay module for detecting a first edge of the delay signal, and thereby generating the first control signal. Accordingly, the spread-spectrum generator can spread the frequency of the input signal by delaying the input signal by various delay time, and the spread-spectrum generator can also reduce electromagnetic interference (EMI).

4 Claims, 8 Drawing Sheets

SPREAD-SPECTRUM GENERATOR

BACKGROUND OF THE INVENTION

1. Field of the Invention

The present invention generally relates to a spread-spectrum generator, and more particularly, to a spread-spectrum generator which can tune the delay time.

2. Description of Related Art

In an electronic circuit, a spread-spectrum generator apparatus is usually used to disperse the frequency of the signal, to prevent the energy of the signal from concentrating on a certain frequency. Frequency of a clock signal which is not performed with a spread-spectrum operation is constant. Energy of such clock signal is concentrated at a signal spectrum tone, and an electromagnetic interference (EMI) thereof is relatively severe. For most electronic devices or packages, electromagnetic interference (EMI) is a common but undesirable disturbance that may interrupt, obstruct, degrade or limit the effective performance of the devices or the whole circuit.

In order to prevent electromagnetic interference (EMI) caused by harmonic of single frequency, spread-spectrum skill is applied. Spread-spectrum means modulating the frequency of a clock signal so that the energy of the clock signal is distributed into more spectrum tones in order to reduce electromagnetic interference of the clock signal. Therefore, such spread-spectrum skill is one of the most popular approaches for solving the EMI problem.

SUMMARY OF THE INVENTION

Accordingly, the present invention is directed to provide a spread-spectrum generator, which can accomplish frequency modulation of a input signal by tuning delay time of the input signal.

The present invention provides a spread-spectrum generator, including a delay module and a control module. The delay module is controlled by a first control signal to delay an input signal by a delay time, and thereby generates a delay signal. The control module is coupled to the delay module for detecting a first edge of the delay signal, and thereby generates the first control signal.

According to an embodiment of the present invention, wherein the delay module includes a digital-to-analog converter and a first voltage-controlled delay device. The digital-to-analog converter converts a digital signal into a voltage control signal, wherein the digital signal is obtained by searching a look-up table according to the first control signal. The first voltage-controlled delay device receives the input signal and the first voltage-controlled delay device is coupled to the digital-to-analog converter for adjusting the delay time according to the voltage control signal so as to generate the delay signal.

According to an embodiment of the present invention, the delay module includes a plurality of first delay cells and a multiplexer. The plurality of first delay cells sequentially delay the input signal, and the plurality of first delay cells respectively generating a plurality of candidate delay signals, wherein each first delay cell is controlled by a voltage control signal to delay the input signal by a delay time; and a multiplexer, controlled by the first control signal to select one of the candidate delay signals to serve as the delay signal.

According to an embodiment of the present invention, the spread-spectrum generator further includes a delay locked loop circuit. The delay locked loop circuit is coupled to the first delay cells for locking a delay reference signal with a reference signal, and the delay locked loop circuit generates the voltage control signal to adjust the delay time of each first delay cell.

According to an embodiment of the present invention, the delay locked loop circuit includes a plurality of second delay cells, a phase detector, a charge pump circuit. Wherein the plurality of second delay cells sequentially delay the reference signal and thereby generate the delay reference signal, wherein each second delay cell is controlled by the voltage control signal to delay the reference signal by the delay time. The phase detector receives the reference signal and the delay reference signal, and the phase detector generates a second control signal according to a phase difference between the reference signal and the delay reference signal. The charge pump circuit charges or discharges according to the second control signal and thereby generates the voltage control signal.

According to an embodiment of the present invention, the control module includes a detecting unit and a counting unit. The detecting unit detects a first edge of the delay signal, and the detecting unit generates a detection signal. The counting unit is coupled to the detecting unit for counting the number of the detection signal to be generated and thereby generates the first control signal.

In the present invention, the spread-spectrum generator bases on the delay cells structure and applies the voltage-controlled delay line (VCDL) structure. With the VCDL structure, the spread-spectrum generator can tune the delay time flexibly. Moreover, since a look-up table is applied in the present invention, we can adjust the delay time by changing the corresponding value in the look-up table.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference counting numbers are used in the drawings and the description to refer to the same or like parts.

Figure 1:
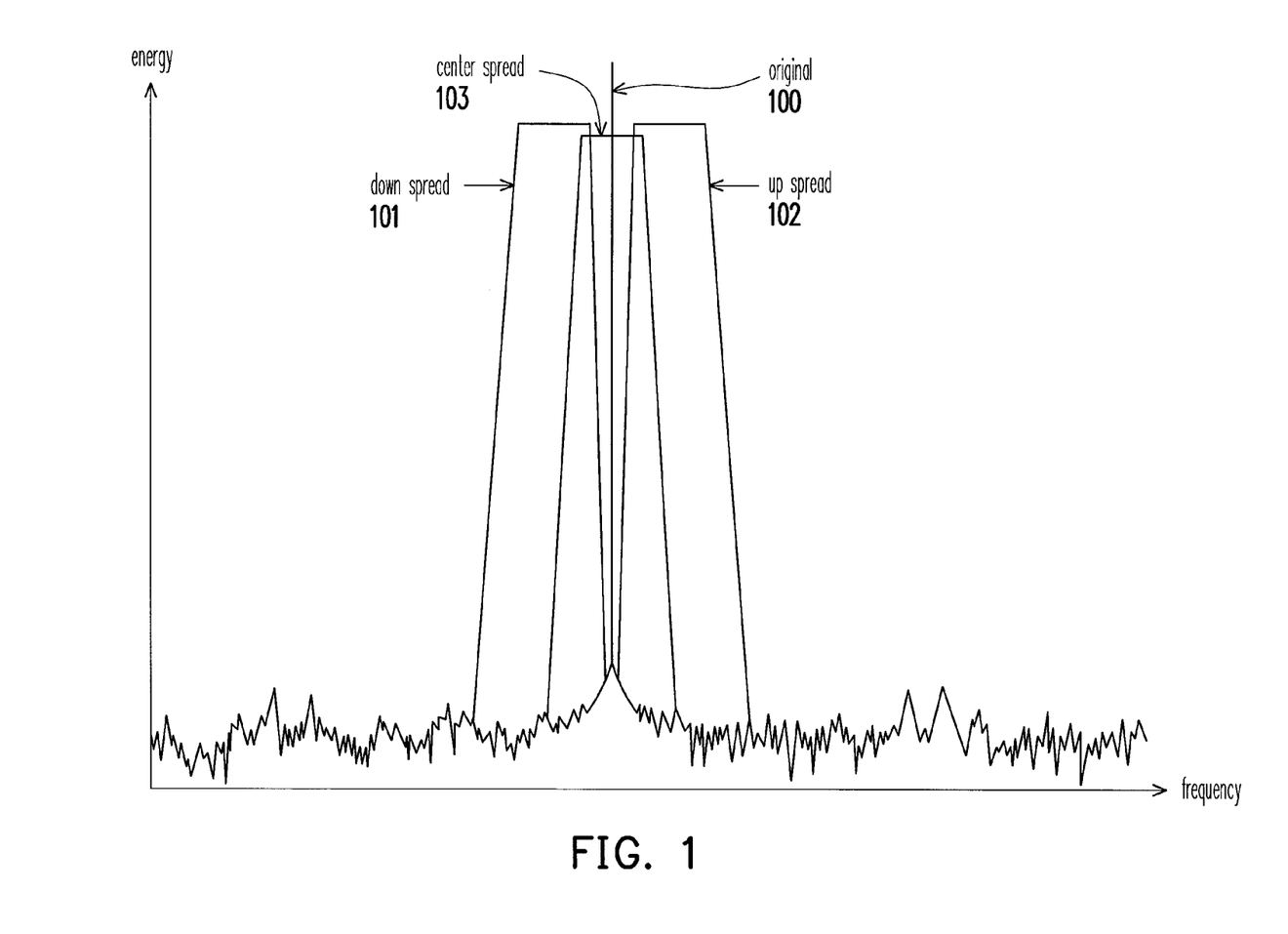
FIG. 1 is a schematic diagram illustrating different types of conventional spread-spectrum operations for clock signals.

FIG. 1 is a schematic diagram illustrating different types of spread-spectrum operations for clock signals. Referring to FIG. 1, FIG. 1 illustrates three spread-spectrum methods including a down spread method, a up spread method, and a center spread method. Wherein the down spread method spreads toward low spectrums, an original clock signal spectrum is marked as 100, and a down-spread clock signal spectrum is marked as 101. For example, the original clock signals have a period T, and the down spread method shifts the period of the original clock signals by 0 to nTd, that is, the period of the shifted clock signals have periods from T to T+nTd. On the other hand, the up spread method spreads toward high spectrums, and an up spread clock signal spectrum is marked as 102. For example, the original clock signals have a period T, and the up spread method shifts the period of the original clock signals by 0 to (−nTd), that is, the period of the shifted clock signals have periods from T to T−nTd. Moreover, the center spread method spreads around the original clock signal spectrum, and a center spread clock signal spectrum is marked as 103. For example, the original clock signals have a period T, and the center spread method shifts the period of the original clock signals by (−nTd/2) to nTd/2, that is, the period of the shifted clock signals have periods from T−(nTd)/2 to T+(nTd)/2.

Figure 2:
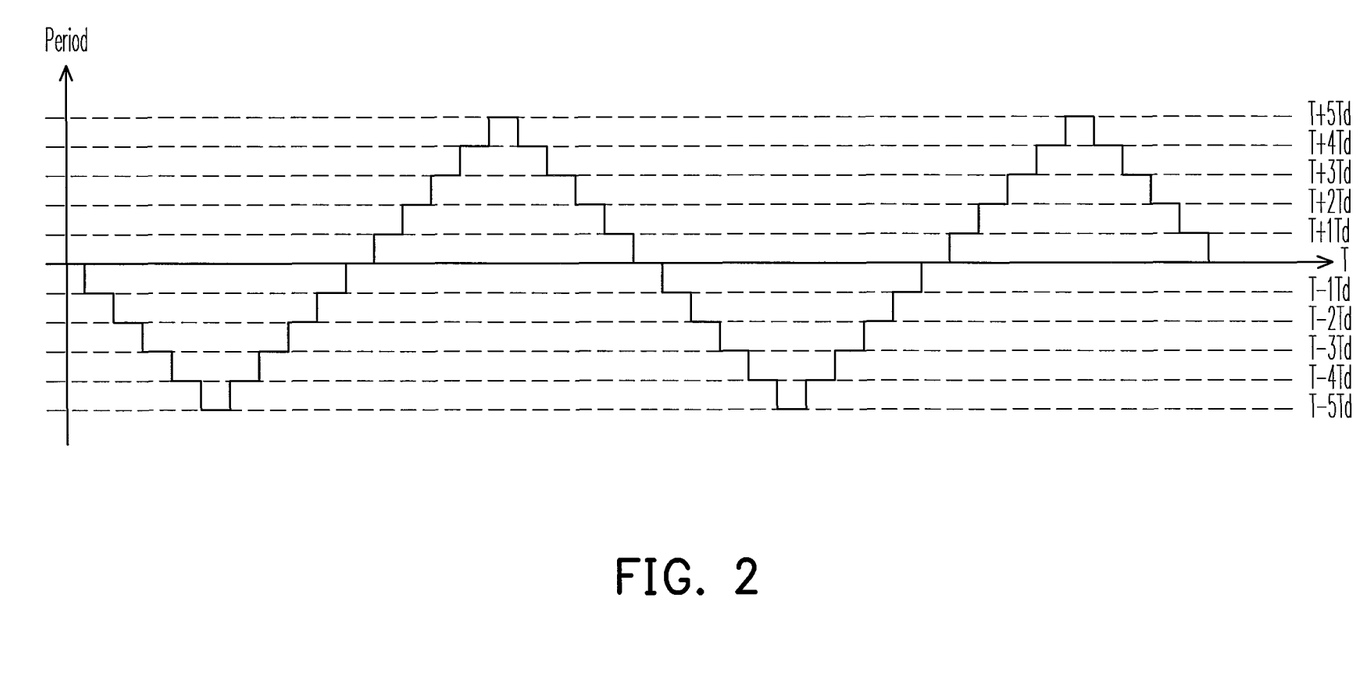
FIG. 2 is a spread range of the input signal in center spread method.

For example, FIG. 2 is a spread range of the input signal in center spread method. Referring to FIG. 2, the period of the input signal is dispersed periodically from 5Td to (−5Td). Thus, the energy of the input signal is distributed into wider frequency range in order to reduce electromagnetic interference (EMI) of the input signal. In order to implement the circuit which can perform the spread-spectrum operations as we mention above, several types of circuits according to embodiments of the present invention are shown below.

Figure 3:
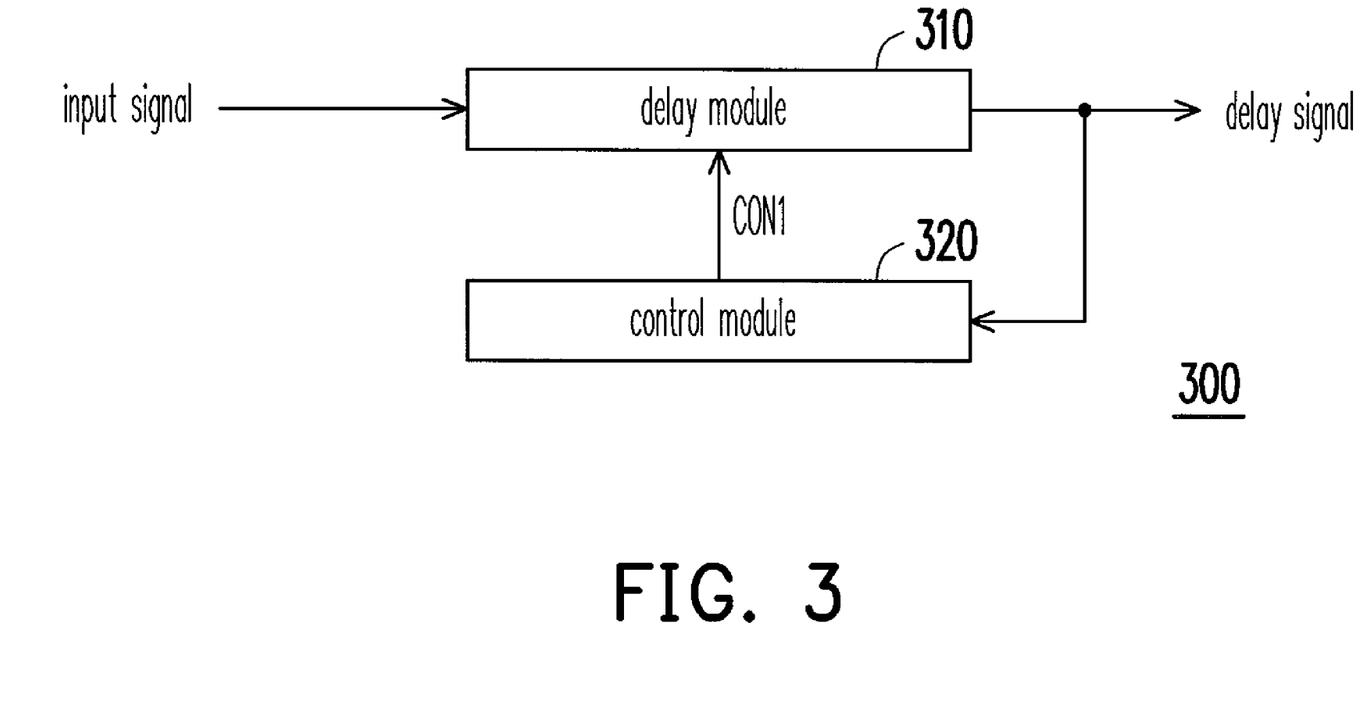
FIG. 3 is a circuit diagram of a spread-spectrum generator according to an embodiment of the present invention.

FIG. 3 is a circuit diagram of a spread-spectrum generator according to an embodiment of the present invention. Referring to FIG. 3, the spread-spectrum generator 300 includes a delay module 310 and a control module 320.

The delay module 310 receives an input signal and a control signal CON1, wherein the delay module 310 delays the input signal by a delay time according to the control signal CON1. The input signal delayed by the delay module 310 is served as a delay signal. The control module 320 is coupled to the delay module 310, and the control module 320 receives the delay signal and generates the control signal CON1 according to the first edge, for example, the positive edge, of the delay signal. One of other possible implementation of the control module 320 will be illustrated below, as shown in FIG. 4.

Figure 4:
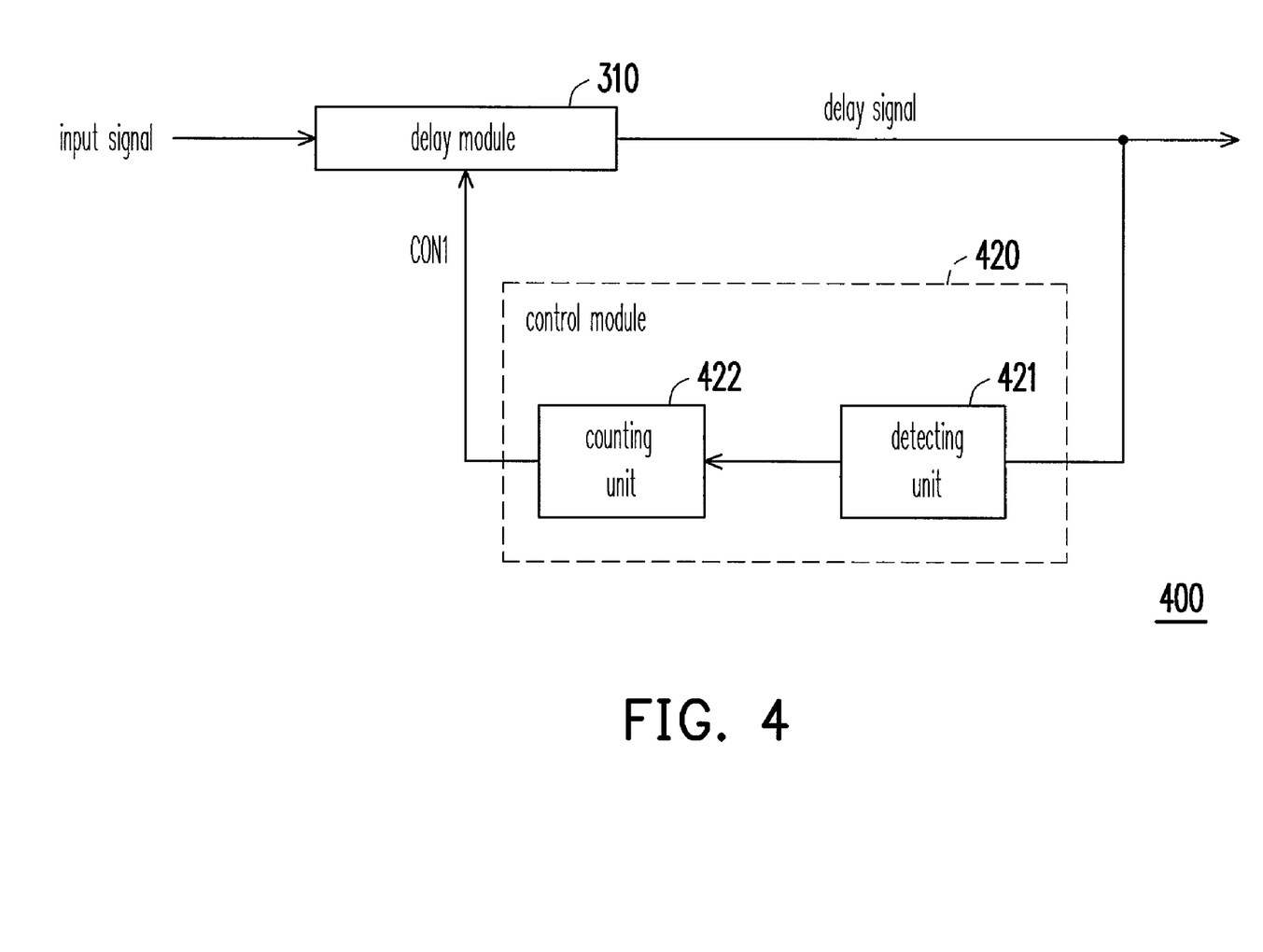
FIG. 4 is a circuit diagram of the control module according to an embodiment of the present invention.

FIG. 4 is a circuit diagram of the control module according to an embodiment of the present invention. Referring to FIG. 4, the spread-spectrum generator 400 includes a delay module 310 and a control module 420, wherein the control module 420 includes a detecting unit 421 and a counting unit 422. The detecting unit 421 receives the delay signal and detects a first edge of the delay signal, for example, the positive edge of the delay signal, and the detecting unit 421 generates a detection signal. The counting unit 422 is coupled to the detecting unit 422 and receives the detection signal generated by the detecting unit 421. Moreover, the counting unit 422 counts the number of the detection signal and generates a control signal CON1 to tune the delay module 310.

Figure 5:
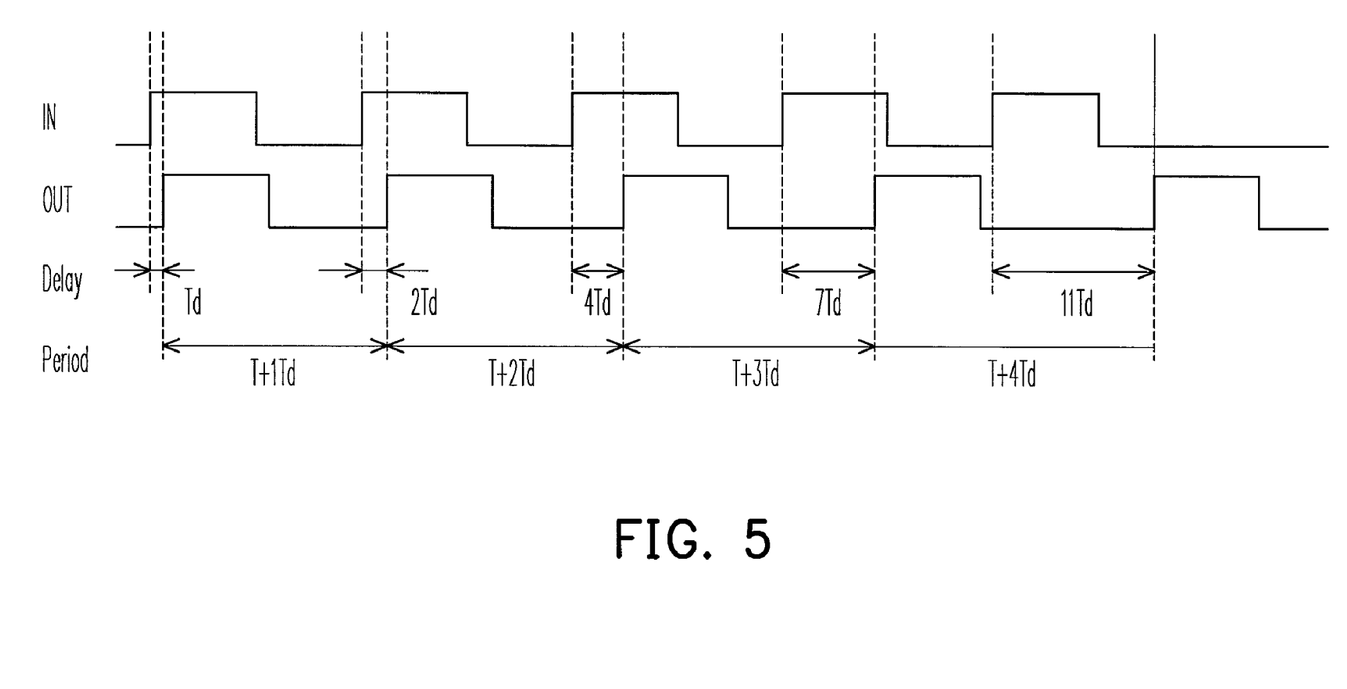
FIG. 5 is a waveform of the input signal and the delay signal in the spread-spectrum generator according to an embodiment of the present invention.

For example, FIG. 5 is a waveform of the input signal and the delay signal in the spread-spectrum generator according to an embodiment of the present invention. Referring to FIG. 4 and FIG. 5, an input signal received by the delay module 310 has a period T. When the delay module 310 receives the positive edge of the input signal, the delay module 310 delays the input signal by a delay time Td and outputs the delayed input signal as the delay signal. Further, the detecting unit 421 receives the delay signal and detects the positive edge of the delay signal, then the detecting unit 421 generates a detection signal. The counting unit 422 counts the number of the detection signal, that is, one detection signal is received, and generates a control signal CON1 to tune the delay time of the delay module 310, for example, the delay time is tuned to 2Td. The delay module 310 delays the input signal by different delay time in each positive edge of the input signal according to the control signal CON1, that is the delay time is selected according to the control signal CON1, wherein the control module 420 receives the delay signal and counts the number of the positive edge of the delay signal, and thereby generates a control signal CON1. Thus, when the delay module 310 receives the $2^{nd}$, $3^{rd}$, $4^{th}$, $5^{th}$ positive edge of the input signal, the delay module 310 delays the input signal by the delay time 2Td, 4Td, 7Td, 11Td respectively, and outputs the delayed input signal as the delay signal.

Figure 6:
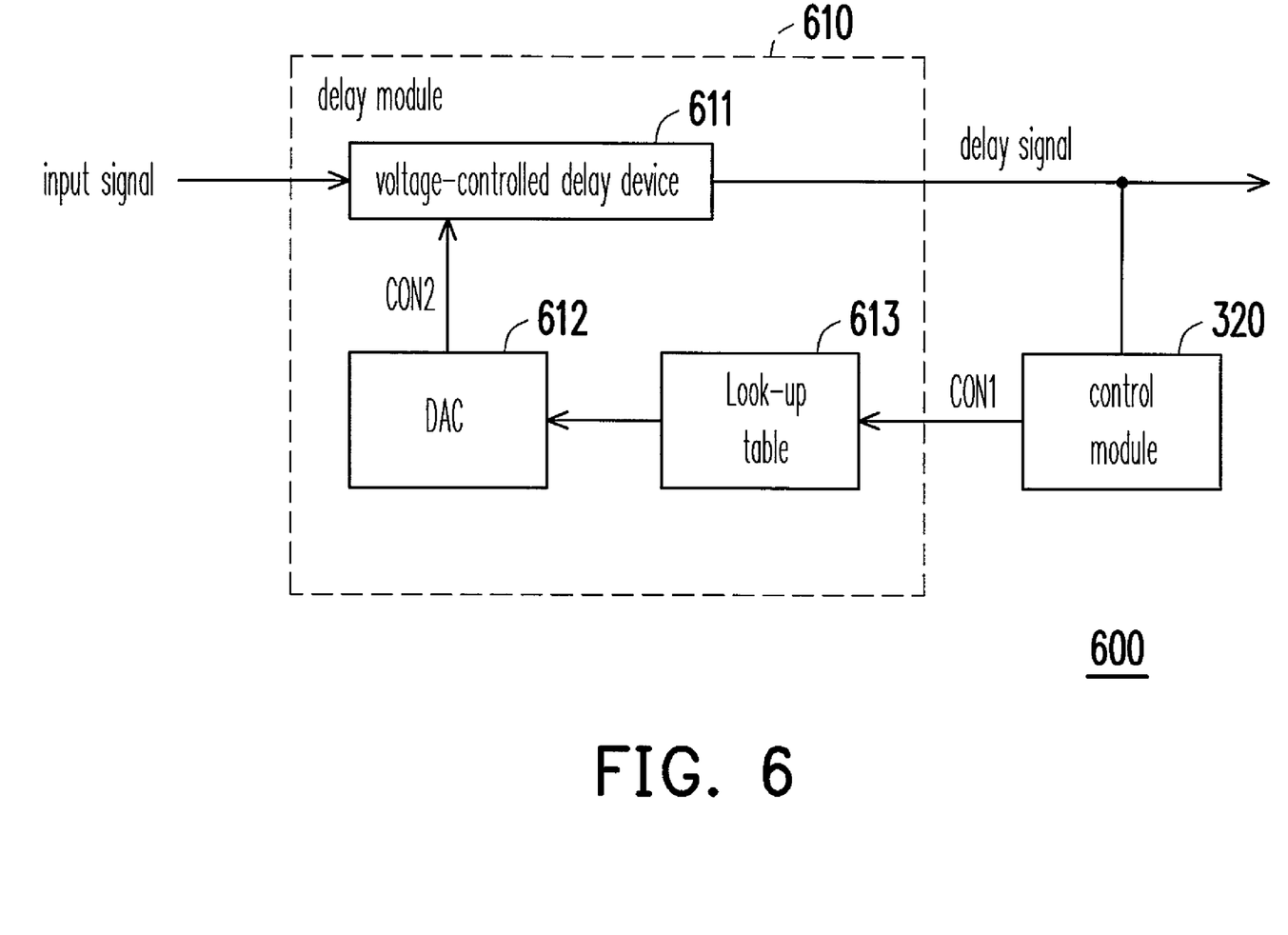
FIG. 6 is a circuit diagram of the delay module according to an embodiment of the present invention.

One of other possible implementation of the delay module 310 in FIG. 3 will be illustrated below, as shown in FIG. 6. FIG. 6 is a circuit diagram of the delay module according to an embodiment of the present invention. Referring to FIG. 6, the spread-spectrum generator 600 includes a delay module 610 and a control module 320, wherein the delay module 610 includes a voltage-controlled delay device 611, a digital-to-analog converter (DAC) 612 and a look-up table 613, for example, the control module 320 has the same function to control module 420. The voltage-controlled delay device 611 receives the input signal and adjusts the delay time according to a voltage control signal CON2 so as to generate the delay signal. The voltage-controlled delay device 611 can perform a spread-spectrum operation by delaying the input signal selected delay time at different positive edges of the input signal respectively. Thus, the frequency of the input signal performed with the spread-spectrum operation is not a constant but a spread range of frequency.

The digital-to-analog converter 612 converts a digital signal into the voltage control signal CON2, wherein the digital signal is obtained by searching the look-up table 613 according to the control signal CON1. For example, the control module 320 can generate the control signal CON1 according to the number of the positive edge of the delay signal. The look-up table 613 receives the control signal CON1, and the control signal CON1 is served as a index to search the look-up table 613. Then, the look-up table 613 transmits the digital signal to the digital-to-analog converter 612 according to the result of searching the look-up table 613.

It should be mentioned that the look-up table 613 transmits the digital signal according to the control signal CON1, wherein the relationship between the digital signal and the control signal CON1 may not be a linear curve. Since the voltage-controlled delay device 611 adjusts the delay time according to the voltage control signal CON2 converted from the digital signal, we can adjust the delay time by changing the relationship between the digital signal and the control signal CON1.

Figure 7:
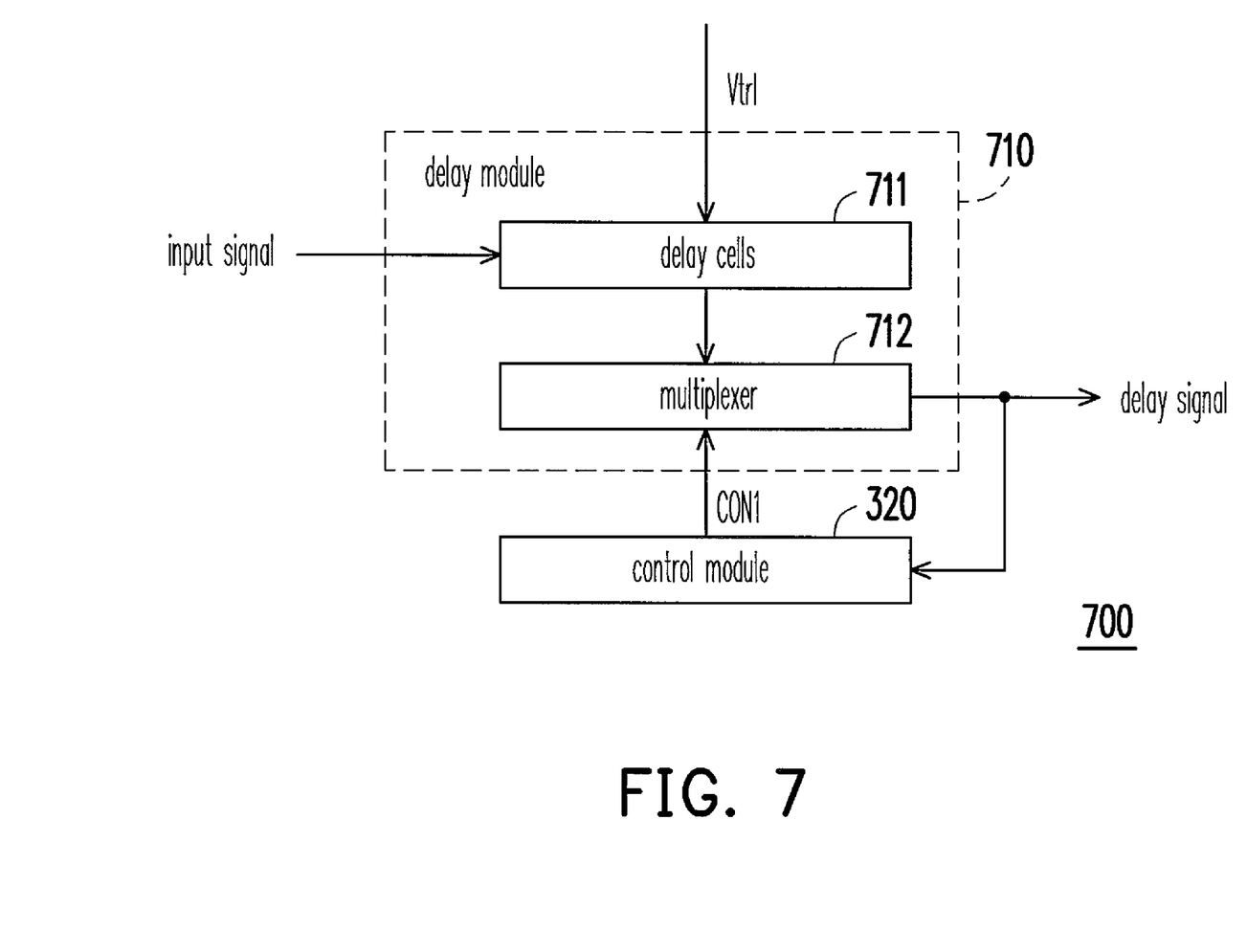
FIG. 7 is a circuit diagram of the delay module according to an embodiment of the present invention.

Referring to FIG. 3, one of other possible implementation of the delay module 310 will be illustrated below, as shown in FIG. 7. FIG. 7 is a circuit diagram of the delay module according to an embodiment of the present invention. Referring to FIG. 7, the spread-spectrum generator 700 includes a delay module 710 and a control module 320, wherein the delay module 710 includes a plurality of delay cells 711, and a multiplexer 712. For example, the control module 320 has the same function to control module 420. The plurality of delay cells 711 are used to delay the input signal by a delay time Td sequentially, and generates a plurality of candidate delay signals respectively, wherein the delay time Td can be adjusted by a voltage control signal Vtrl. The multiplexer 712 is controlled by the control signal CON1 to select one of the candidate delay signals to serve as the delay signal. That is, each of the candidate delay signals has different periods from T+(nTd)/2 to T−(nTd)/2, where T is the period of the input signal, and n is determined by the number of the delay cells 711.

Figure 8:
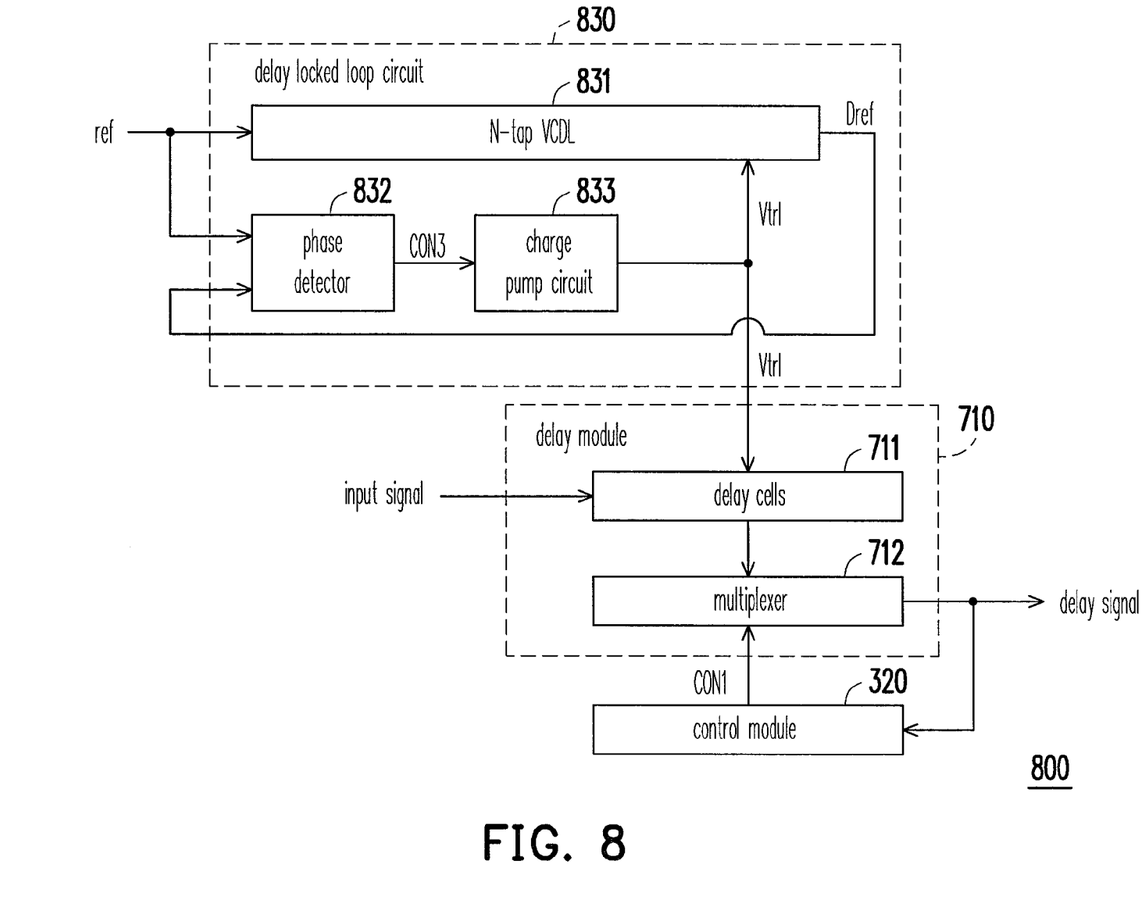
FIG. 8 is a circuit diagram of the spread-spectrum generator according to an embodiment of the present invention.

Referring to FIG. 7, one of other possible implementation of the spread-spectrum generator 700 further comprises a delay locked loop circuit, as shown in FIG. 8. FIG. 8 is a circuit diagram of the spread-spectrum generator according to an embodiment of the present invention. Referring to FIG. 8, the spread-spectrum generator 800 includes a delay module 710, a control module 320, and a delay locked loop circuit 830, wherein the delay module 710 includes a plurality of delay cells 711, and a multiplexer 712. The plurality of delay cells 711 are used to sequentially delay the input signal and generates a plurality of candidate delay signals respectively, wherein each delay cell 711 is controlled by a voltage control signal Vtrl to delay the input signal by a delay time Td. The multiplexer 712 is controlled by the control signal CON1 to select one of the candidate delay signals to serve as the delay signal. The delay locked loop circuit 830 is coupled to the delay cells 711 for locking a delay reference signal (Dref) with a reference signal (ref), and generates the voltage control signal Vtrl to adjust the delay time Td of each delay cell 711.

For example, the delay locked loop circuit 830 comprises a N-tap VCDL (Voltage Controlled Delay Line) 831, a phase detector 832, and a charge pump circuit 833. The N-tap VCDL 831 delay the reference signal ref sequentially and thereby generate the delay reference signal Dref, wherein the N-tap VCDL 831 is controlled by the voltage control signal Vtrl to delay the reference signal ref by a delay time. The phase detector 832 receives the reference signal ref and the delay reference signal Dref, and the phase detector 832 generates a control signal CON3 according to a phase difference between the reference signal ref and the delay reference signal Dref. The charge pump circuit 833 charges or discharges according to the control signal CON3 and thereby generates the voltage control signal Vtrl. The N-tap VCDL 831, the phase detector 832 and the charge pump circuit 833 form a close loop for providing a stable signal (i.e. voltage control signal Vtrl) to the delay module 710.

Therefore, we can adjust the delay time Td of the delay cell 711 by adjusting the voltage control signal Vtrl outputted from the delay lock loop circuit 830, and the reference signal ref used in the delay lock loop circuit 830 is served as a preset signal for generating the delay time Td of the delay cell 711.

In another embodiment, the delay time Td is a ratio of a period of the reference signal ref to an amount of the N-tap VCDL 831. For example, the delay lock loop circuit 830 with the N-tap VCDL 831 receive the reference signal ref with its period Tref, and the delay time Td of the delay cell 711 is (Tref/N). Thus, we can apply the delay time Td more precisely by selecting the period of the reference signal ref.

To sum up, the spread-spectrum generator provided by the present invention adjusts the frequency of an input signal by delaying the input signal by a delay time. With the spread-spectrum generator, the EMI caused by harmonic of one single frequency can be greatly reduced. Moreover, a delay locked loop circuit is applied to set the delay time of the delay module, so that we can change the spread range of the input signal by selecting the period of the reference signal of the delay locked loop circuit.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A spread-spectrum generator, comprising:
    a delay module, controlled by a first control signal to delay an input signal by a delay time, and thereby generate a delay signal; and
    a control module, coupled to the delay module for detecting a first edge of the delay signal, and thereby generating the first control signal,
    wherein the delay module comprises:
    a plurality of first delay cells, sequentially delaying the input signal, and respectively generating a plurality of candidate delay signals, wherein each first delay cell is controlled by a voltage control signal to delay the input signal by a delay time; and
    a multiplexer, controlled by the first control signal to select one of the candidate delay signals to serve as the delay signal.

2. The spread-spectrum generator according to claim 1, wherein the spread-spectrum generator further comprises:
    a delay locked loop circuit, coupled to the first delay cells for locking a delay reference signal with a reference signal, and generating the voltage control signal to adjust the delay time of each first delay cell.

3. The spread-spectrum generator according to claim 2, wherein the delay locked loop circuit comprises:
    a plurality of second delay cells, sequentially delaying the reference signal and thereby generate the delay reference signal, wherein each second delay cell is controlled by the voltage control signal to delay the reference signal by the delay time;
    a phase detector, receiving the reference signal and the delay reference signal, and generating a second control signal according to a phase difference between the reference signal and the delay reference signal; and
    a charge pump circuit, charging or discharging according to the second control signal and thereby generating the voltage control signal.

4. The spread-spectrum generator according to claim 3, wherein the delay time is a ratio of a period of the reference signal to an amount of the second delay cells.

* * * * *